United States Patent
Ahmadi et al.

(10) Patent No.: US 12,256,303 B2
(45) Date of Patent: Mar. 18, 2025

(54) SYSTEMS AND METHODS FOR EMERGENCY BROADCAST USING DELEGATED DISCOVERY

(71) Applicant: VERIZON PATENT AND LICENSING INC., Basking Ridge, NJ (US)

(72) Inventors: Hossein M. Ahmadi, Parsippany, NJ (US); Ali Imdad Malik, East Brunswick, NJ (US); Violeta Cakulev, Millburn, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 334 days.

(21) Appl. No.: 17/720,489

(22) Filed: Apr. 14, 2022

(65) Prior Publication Data

US 2023/0336957 A1 Oct. 19, 2023

(51) Int. Cl.
*H04W 4/90* (2018.01)
*H04W 4/20* (2018.01)
*H04W 4/50* (2018.01)
*H04W 24/04* (2009.01)

(52) U.S. Cl.
CPC ............... *H04W 4/90* (2018.02); *H04W 4/20* (2013.01); *H04W 4/50* (2018.02); *H04W 24/04* (2013.01)

(58) Field of Classification Search
CPC .......... H04W 4/90; H04W 4/50; H04W 4/20; H04W 24/04
USPC ....................................................... 455/404.1
See application file for complete search history.

(56) References Cited

U.S. PATENT DOCUMENTS

| | | | |
|---|---|---|---|
| 2022/0060547 A1* | 2/2022 | Krishan | H04L 67/56 |
| 2023/0261953 A1* | 8/2023 | Lu | H04L 67/56 |
| | | | 709/223 |
| 2023/0362267 A1* | 11/2023 | Landais | H04L 67/567 |

* cited by examiner

*Primary Examiner* — Maria El-Zoobi (57) ABSTRACT

According to disclosed embodiments, as discussed below, a cell broadcasting framework is provided including receiving a request from a Network Function (NF) consumer by a service communication proxy (SCP) on a network, the request including a set of parameters, identifying a plurality of target NF producers corresponding to the set of parameters, transmitting the request to the plurality of target NF producers, receiving a plurality of successful request responses corresponding to some or all of the plurality of target NF producers, transmitting one of the plurality of successful request response to the NF consumer, and discarding all other successful request responses.

20 Claims, 4 Drawing Sheets

SYSTEMS AND METHODS FOR EMERGENCY BROADCAST USING DELEGATED DISCOVERY

BACKGROUND

When sending emergency broadcast messages existing mobile networks may use direct communication models. In direct communications models a network function (NF) consumer must perform discovery and selection of target NF producers by either using a pre-configured knowledge base of NF producers or by interacting with a network repository function (NRF). While indirect communications models may offload some of the work to a service communication proxy (SCP), a significant amount of work remains to be performed by the NF consumer. The disclosed systems and methods provide an emergency message broadcasting framework that expands the scope of existing communications models.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Within current communications protocols and implementations, Public Warning Systems (PWS) or Early Warning Systems (EWS) can use Cell Broadcasting to transmit emergency broadcast messages to multiple devices in a mobile network simultaneously. Messages can be broadcast to the whole network or to certain geographical areas, down to the size of a single radio cell.

Typically, emergency messages can be originated and sent from a Cell Broadcast Entity (CBE) to a Cell Broadcast Center Function (CBCF). The CBE may generate emergency message content, determine an emergency message destination (e.g., geographical area or specific devices), or determine a transmission schedule (e.g., date and time of transmission, parameter to initiate transmission). For example, a CBE may be a government agency such as the Federal Emergency Management Agency (FEMA). In practice the CBE may have a user interface for generating and transmitting messages (e.g., to the CBCF). A CBCF connects the CBE to a mobile network operator's core network (described in more detail below). The CBCF can manage the transmission of messages received from the CBE and routes them to the required network devices (e.g., target cells). In some embodiments, the CBCF can operate as a broadcast center that manages all types of broadcasts (e.g., paid advertising).

According to some embodiments, when the CBCF receives an emergency message from the CBE, the CBCF identifies an applicable Access & Mobility Management Function (AMF) and sends a request to the AMF to communicate (e.g., transmit the emergency message to the corresponding radio base stations in the geographical area identified by the CBE). In some embodiments, the CBCF sends the request to the AMF using a service based interface. For example, in some embodiments, the CBCF may send the request to the AMF using an N50 interface. Then, the AMF sends a request to transmit to the corresponding radio base stations. In some embodiments, the AMF sends the request to the corresponding base radio stations using a service based interface. For example, in some embodiments, the AMF sends the request to the corresponding base radio stations using an N2 interface. It will be noted that, as opposed to normal messaging between the core network and the devices (e.g., when sending an emergency message between users through SMS), no bi-directional interaction between the AMF and the devices take place in the case of cell broadcasting, instead the emergency message is sent (i.e., broadcast) from the AMF to the devices via the radio network. In some embodiments, the AMF may report back to the CBCF if the transmission was successful or not using reports from the radio network.

Current communication models (e.g., by 3GPP) provide for communications between a consumer network function (NF) and a NF producer in a communications network (e.g., a 5G network). In some embodiments, a NF consumer may be a CBCF. In some embodiments, a NF producer may be an AMF. In some embodiments, a NF consumer and/or a NF producer may be referred to as an NF instance. In some models, the consumer and the producer communicate directly. For example, a NF consumer may send a service request to the NF producer, the NF producer may respond with a service response and the NF consumer may follow up with subsequent request. In some direct communication models, the consumer may be provisioned with a set of NF profiles and communicates directly with the corresponding producer or producers. In other direct communication models, the consumer performs discovery of other NF instances by interacting with a network repository function (NRF). In some embodiments, an NRF maintains an updated repository of all the NF instances in the communications network along with the services provided by each, and allows an NF instance to keep track of other NF instances (e.g., whether connected, disconnected, and the like).

In some models, the consumer and the producer communicate indirectly using a service communication proxy (SCP). As will be noted, in some embodiments, a SCP provides load balancing, message manipulation, message distribution, overload handling and traffic prioritization. For example, in a non-limiting embodiment, a NF consumer communicates with the SCP and the SCP communicates with the NF producer. In some indirect communication models, the NF consumer may communicate with the SCP and the NRF and, additionally, the NRF and the SCP may communicate with each other. In an embodiment, NF consumers discover other NF instances using the NRF. In some embodiments, from the discovered NF instances the NF consumer selects the NF instance or instances desired. Based on the selected NF instances the NF consumer sends a request to the SCP including the information (e.g., an address or a unique identifier) of the selected NF instance(s).

In some embodiments, the SCP may interact with the NRF to get other information regarding the selected NF instance (e.g., location, load, and the like). Then, the SCP routes the request to the selected NF instance.

In some direct communications model, the NF consumer does not perform any discovery or selection of NF instances. In some indirect communication models, the NF consumer may not be connected to the NRF, however, the SCP may still be connected to the NRF. This model may sometimes be referred to as indirect communication with delegated discovery. Delegated discovery refers to the offloading (e.g., delegation) of the NF producer selection operation to the SCP, instead of the NF consumer interacting with the NRF and performing NF producer selection. In some embodiments, this model allows for a lessens the resource load of the NF consumer.

For example, in some embodiments, in an indirect communication model with delegated discovery an NF consumer intends to communicate with an NF producer. In those embodiments, the NF consumer may first send the service request to the SCP with a set of selection parameters (e.g., identifying desired NF instances, geographic area, (tracking area identity (TAI) that the SCP may use to discover and select a NF producer. In some embodiments, the SCP may use the selection parameters to perform discovery upon receiving the request. In some embodiments, the SCP may interact with the NRF to gather information about NF producers. In some embodiments, the SCP may already contain information regarding the NF producers—gained, for example, through previous interactions with an NRF. In some embodiments, the selection parameters may include a user equipment ("UE")—discussed in more detail below—identifier. In those embodiments, the SCP may identify the NF producers based on the UE identifier.

According to some embodiments, the SCP may then select one or more target NF producers based on the set of selection parameters and the SCP together with the NRF to authorize the NF consumer to communicate with the NF producer. Once the NF consumer is authorized to communicate with the NF producer, the SCP may forward the request to the NF producer. In turn, the NF producer may reply with a response to the SCP, and the SCP may route the response to the NF consumer. In some embodiments, the NF producer's response may include a resource address that the NF consumer uses in subsequent requests.

Figure 1:
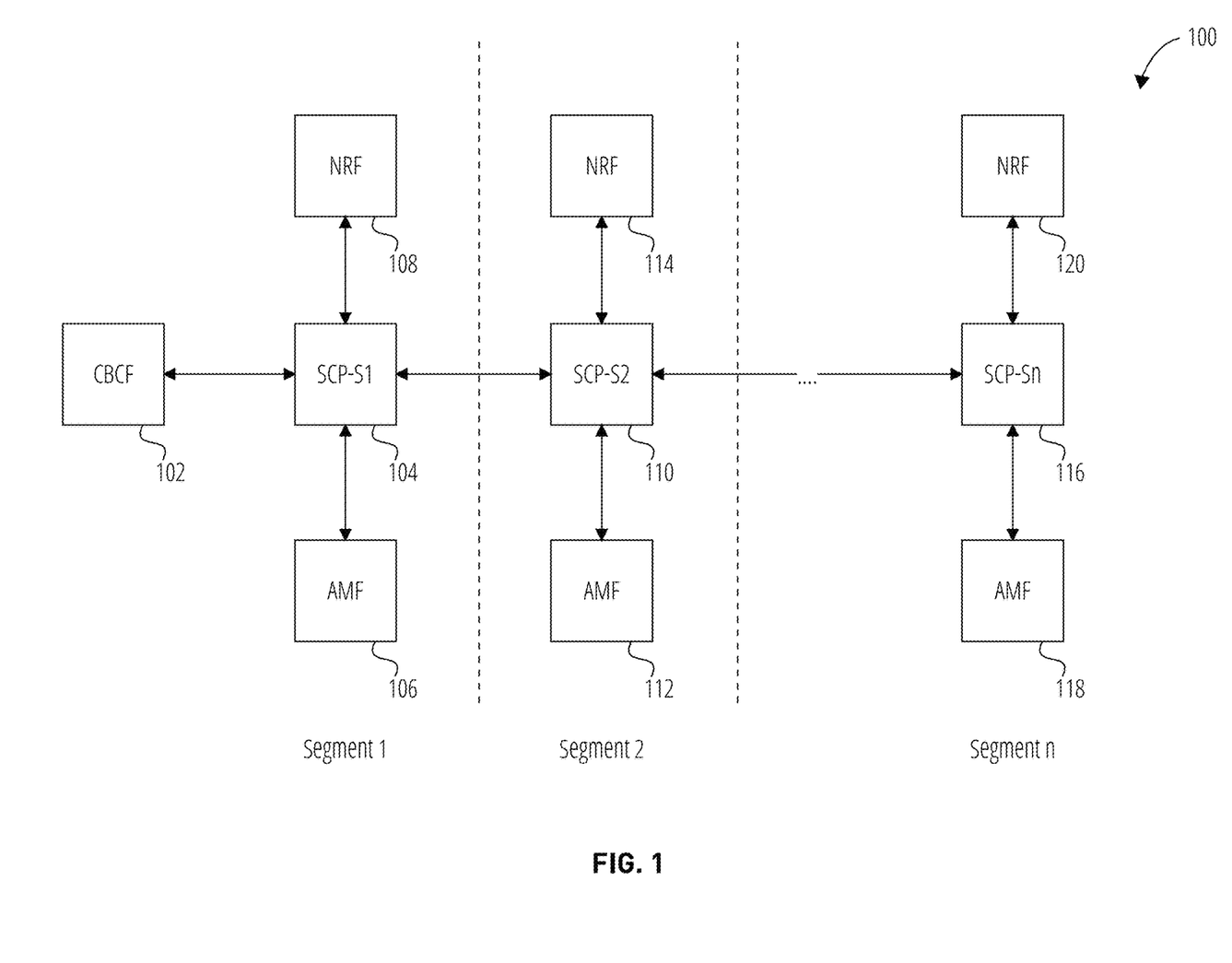
FIG. 1 is a block diagram of an example configuration within which the systems and methods disclosed herein could be implemented according to some embodiments of the present disclosure.

With regard to FIG. 1, a block diagram illustrating of an example configuration within which the systems and methods disclosed herein could be implemented according to some embodiments of the present disclosure is shown. According to some embodiments, as discussed above, a network 100 includes a CBCF 102 (e.g., a NF consumer) connected to a first segment through SCP 104. In some embodiments, the SCP 104 can be connected to other SCPs (e.g., SCPs 110 and 116). In some embodiments, the SCPs can be connected in series, parallel, or a combination thereof. In some embodiments, SCP 110 may communicate with NRF 114 and AMF 112. In some embodiments, SCP 116 may communicate with NRF 120 and AMF 118. In some embodiments, the SCPs, AMFs, and NRFs of network 100 may be service-based architectural elements of a network 100 (e.g., a 5G core).

While FIG. 1 shows a single arrangement of an SCP connected to an NRF and an AMF (e.g., a NF producer) per segment, it will be understood that any given segment may have one or more SCPs, NRFs, and AMFs and other network elements. Similarly, while a series of segments are shown in series, it will be understood that different segments may be connected in series, parallel, or a combination thereof. In some embodiments, each network segment may belong to a geographic area. In some embodiments, each network segment belongs to a TAI. In some embodiments, each network segment may belong to a set of mobile devices connected to a base station. In some embodiments, multiple segments may correspond to a geographic area. As noted above, in some embodiments, the CBCF may be connected to the SCPs using a service based interface, such as an N50 interface or other similar interface used in a reference point architecture (e.g., N1-N59). In some embodiments the SCPs may be connected to the AMFs using an N50 interface.

According to some embodiments, as noted above, SCPs 104, 110, and 116 operate to efficiently and securely manage routing operations within the network 100. In some embodiments, SCPs 104, 110, and 116 can operate to route messages within and between multiple data centers via information provided by NRFs 108, 114, and 120. According to some embodiments, as discussed below in more detail, SCPs 104, 110, and 116 can enable communication between various NF nodes, such as, for example CBCF 102 and AMFs 106, 112, and 118.

According to some embodiments, each NRF, without regard to the segment it corresponds to, may contain a network 100 model representing all elements (e.g., NF instances) in the network 100. In those embodiments, any SCP may perform discovery of all other elements in the network 100 through a corresponding NRF. For example, in a non-limiting embodiment, during operations a request may be received by SCP 104 and then be routed to SCP 110. In some embodiments, SCP 104 may then be registered with NRF 114. In some embodiments, NRFs 108, 114, and 120 may provide a record of the NF operations and services available within a network(s). According to some embodiments, the NRFs 108, 114, and 120 can provide a NF profile that can include both general instance attributes and the corresponding attribute values of a given NF's operations, as well as instance specific service attributes and attribute values of the services on the network.

In the illustrated embodiment, during operation, the CBCF 102 may receive an emergency broadcast message request from a CBE. In turn, the CBCF 102 may send the request including selection parameters to SCP 104. In some embodiments, the SCP 104 may communicate with the NRF 108 to perform discovery and selection of the target AMF (e.g., AMF 106, 112, and 118). In some embodiments, the NRF 108 (or alternatively, NRF 114 or NRF 120) may include information on every AMF in every segment. In those embodiments, the SCP 104 may then select the target AMF and route the request to the corresponding SCP. For example, in an embodiment, CBCF 102 sends a request to SCP 104 with selection parameters corresponding to AMF 112. The SCP 104 may interact with NRF 108 and determine that AMF 112 is operatively connected to SCP 110. Then, the SCP 104 may route the request to the SCP 110 which in turn may communicate with NRF 114 to validate whether AMF 112 is the correct target AMF. If so, the SCP 110 may then route the requests to AMF 112. In some embodiments, NRF 108 may not have any information regarding AMFs that meet the selection parameters. In those embodiments, the SCP 104 may route the request to one or more SCPs (e.g., SCP 110, SCP 116). Then, SCP 110 and/or SCP 116 may perform discovery and selection using NRF 114 and NRF 120, respectively.

Figure 2:
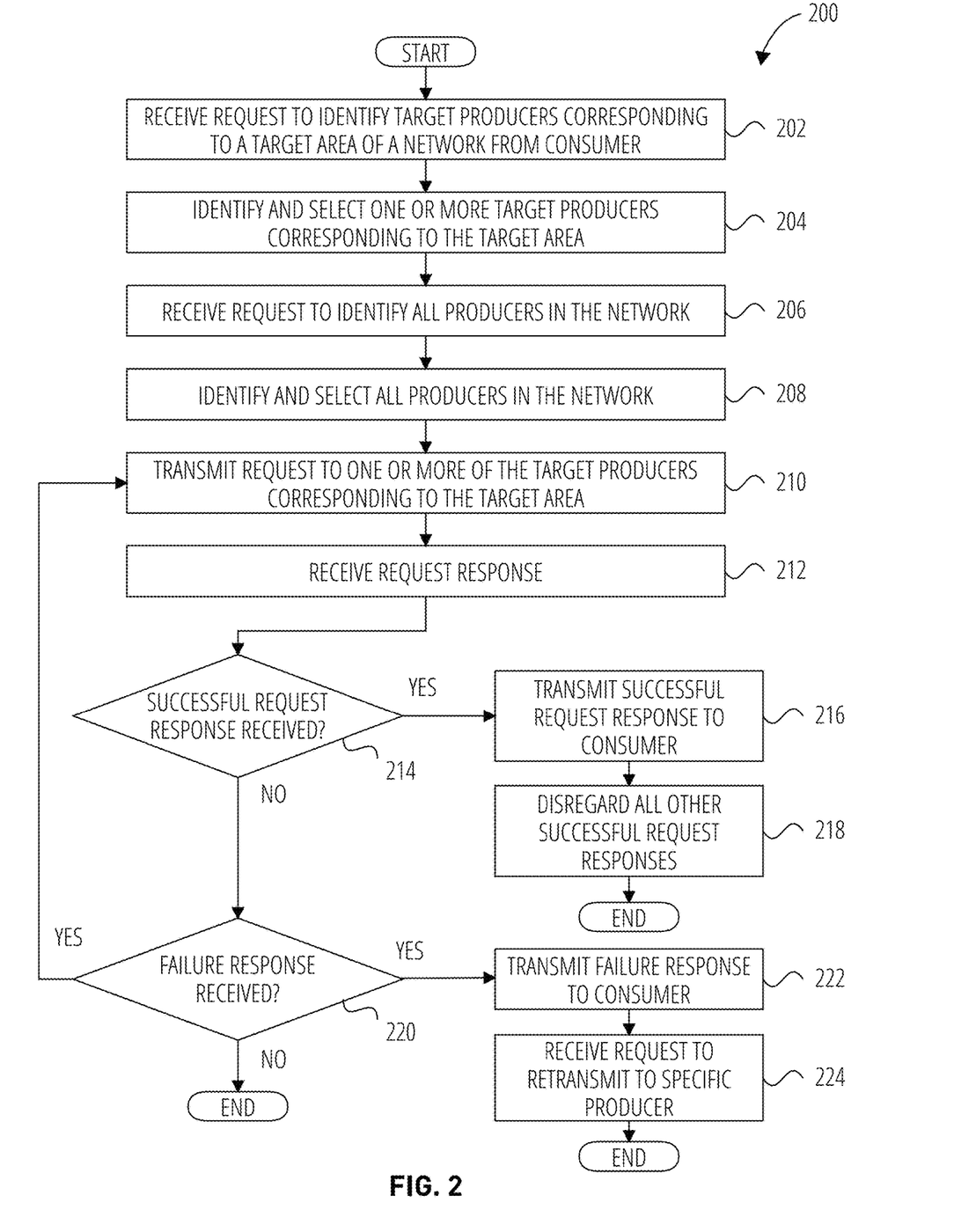
FIG. 2 is a flow diagram illustrating an exemplary process for cell broadcasting according to some embodiments of the present disclosure.

Turning to FIG. 2, FIG. 2 illustrates a flow diagram of an exemplary Process 200 for emergency cell broadcasting according to some embodiments of the present disclosure.

The components of FIG. 1 will be used to discuss the operations of the Steps of Process 200.

Process 200 begins with Step 202 where an SCP (e.g., SCP 104) may receive a request from a service consumer or NF consumer (e.g., CBCF 102) to identify target service producers or NF producers (e.g., AMFs 106, 112, and 118) corresponding to a target geographical area, set of user devices, TAI, and the like. According to some embodiments, the request can include information related to, but not limited to, the requesting NF (e.g., CBCF 102, for example), the service being requested, TAI parameters, geographical area information, and the like, or some combination thereof.

In some embodiments, the request can comprise a broadcast message such as an emergency alert message sent by a CBE to one or more UEs within a target geographical area. In some embodiments, the CBE acts as a gateway between network operator and alerting authority and receives the emergency message from the alerting authority, and relays the message to the CBCF, which the network operator administrates. In some embodiments, the CBCF can perform various pre-processing or formatting operations (e.g., converting into a Cell Broadcast Service (CBS) format) on the emergency message before relaying the message to the SCP. In previous systems, the CBCF may transmit the formatted messages directly to AMFs in the core network. However, in networks that implement delegated discovery (e.g., via an SCP), the CBCF may not be capable of identifying AMFs directly. As such, in the various embodiments which utilize an SCP, the request in Step 202 can be configured as a delegated discovery request to the SCP(s). In some embodiments, such a discovery request may include, but is not limited to, the requested AMF service name, the NF type of the requested NF service (e.g., AMF), NF type of the requesting NF service consumer (e.g., CBCF), and the like.

In Step 204, the request from Step 202 is analyzed by the SCP to identify and select one or more target NF producers corresponding to the target area. In some embodiments, the SCP can parse the request and identify the information included and/or referenced therein. For example, Step 204 can involve the SCP analyzing an emergency request message (e.g., CBS message), and identifying the requested NF service name, the NF type of the requested NF service (e.g., AMF), NF type of the requesting NF service consumer (e.g., CBCF), and the like, as discussed above. In some embodiments, the SCP may communicate at least some of the parameters received on the request to one or more SCPs and/or one or more NRFs. In some embodiments, the NRFs may return an address or list of addresses corresponding to the target NF producers matching the some or all of the parameters.

In Step 206, the one or more SCPs (e.g., SCPs 104, 110, and 116) may receive a request from the service consumer to identify all service producers or NF producers present or available in the network 100. In Step 208, the SCPs may identify and select some or all NF producers in the network.

According to some embodiments, in Step 210, the SCP may forward or route (e.g., broadcast) the request to the target group of NF producers identified in Step 204. In some embodiments, in Step 210, the SCP may forward or route (e.g., broadcast) the request to the target group of NF producers identified in Step 204 through other SCPs (e.g., SCP 110). In some embodiments, the SCPs may communicate the target group of NF producers identified in Step 204 to the NF consumer. In some embodiments, the SCPs may forward or route the request to some or all of the identified NF producers identified in Step 208. In some embodiments, the SCPs may communicate the NF producers identified in Step 208 to the NF consumer.

In Step 212, the SCPs may receive a request response from one or more NF producers. In Step 214, if a successful request response is received in Step 212, then, in Step 216 the SCP may transmit the successful request response to the NF consumer. According to some embodiments, in Step 218, once the SCP has received one successful request response, the SCP will disregard any other successful request response received thereafter and Process 200 may be terminated.

According to some embodiments, if no successful request response is received in Step 216 then, Process 200 continues to Step 220. In some embodiments, in Step 220 if a failure response is received Process 200 may return to Step 210 where the SCP may retransmit the request. In some embodiments, a failure response may include information related to the NF producer related to the failure response. For example, in an embodiment, the SCP may receive a failure response from an AMF including a server header of the failed AMF (e.g., Server: AMF-54804518-4191-46b3-955c-ac631f953ed8).

In some embodiments, the SCP may retransmit the request to the AMF using the AMF server header. In some embodiments, the SCP may retransmit the request to other AMFs within the same segment as the failed AMF.

In some embodiments, in Step 220 if a failure response is received Process 200 may continue to Step 222. In Step 222, the SCP may transmit the failure response to the NF consumer. In an embodiment, the SCP may route the failure response including an AMF server header of the failed AMF to a CBCF (e.g., the NF consumer). In turn, in Step 224, the NF consumer may send a new request to the SCP to send the request to the NF producer associated with the failure response. For example, in an embodiment, a SCP may send the failure response including the server header of the failed AMF to the CBCF, in turn the CBCF may resend the request only to the failed AMF using the server header.

Figure 3:
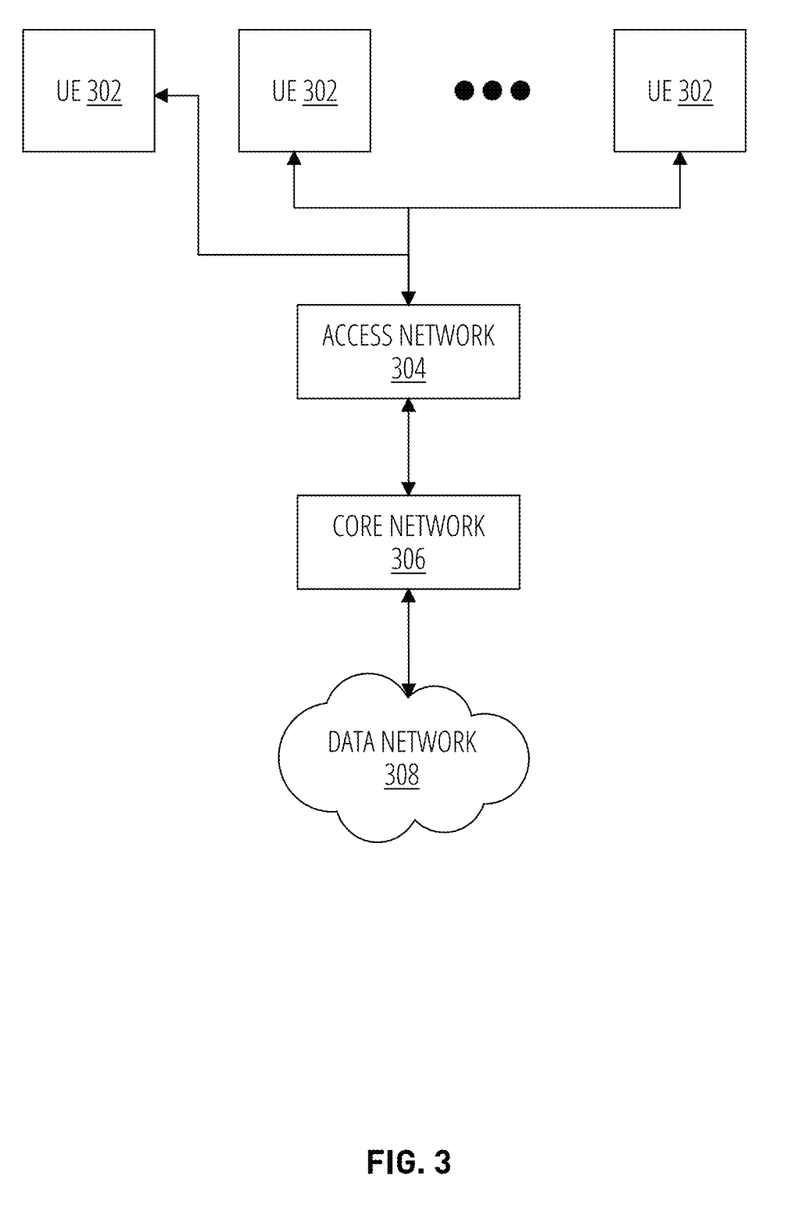
FIG. 3 is a block diagram of an example network architecture according to some embodiments of the present disclosure.

FIG. 3 is a block diagram of an example network architecture according to some embodiments of the present disclosure. In the illustrated embodiment, user equipment ("UE") 302 accesses a data network 308 via an access network 304 and a core network 306. In the illustrated embodiment, UE 302 comprises any computing device capable of communicating with the access network 304 (e.g., device 400 discussed in relation to FIG. 4). As examples, UE 302 may include mobile phones, smart devices, tablets, laptops, sensors, IoT devices, autonomous machines, unmanned aerial vehicles (UAVs), wired devices, wireless handsets, and any other devices equipped with a cellular or wireless or wired transceiver.

In the illustrated embodiment of FIG. 3, the access network 304 comprises a network allowing network communication with UE 302. In general, the access network 304 includes at least one base station that is communicatively coupled to the core network 306 and coupled to zero or more UE 302.

In some embodiments, the access network 304 comprises a cellular access network, for example, a fifth-generation (5G) network or a fourth-generation (4G) network. In one embodiment, the access network 304 can comprise a Next-Gen Radio Access Network (NG-RAN), which can be communicatively coupled to UE 302. In an embodiment, the access network 304 may include a plurality of base stations (e.g., eNodeB (eNB), gNodeB (gNB)) communicatively connected to UE 302 via an air interface. In one embodiment, the air interface comprises a New Radio (NR) air interface. For example, in a 5G network, UE 302 can be communicatively coupled to each other via an X2 interface, and in some embodiments, for example, such coupling can be via Wi-Fi functionality, Bluetooth, or other forms of spectrum technologies, and the like.

In the illustrated embodiment, the access network 304 provides access to a core network 306 to the UE 302. In the illustrated embodiment, the core network may be owned and/or operated by a network operator (NO) and provides wireless connectivity to UE 302 via access network 304. In the illustrated embodiment, this connectivity may comprise voice and data services.

At a high-level, the core network 306 may include a user plane and a control plane. In one embodiment, the control plane comprises network elements and communications interfaces to allow for the management of user connections and sessions. By contrast, the user plane may comprise network elements and communications interfaces to transmit user data from UE 302 to elements of the core network 306 and to external network-attached elements in a data network 308 such as, but not limited to, the Internet, a local area network (LAN), a wireless LAN, a wide area network (WAN), a mobile edge computing (MEC) network, a private network, a cellular network, and the like.

In the illustrated embodiment, the access network 304 and the core network 306 may be operated by a NO. However, in some embodiments, the networks (304, 306) may be operated by a private entity, different entities, and the like, and may be closed to public traffic. In these embodiments, the operator of the device can simulate a cellular network, and UE 302 can connect to this network similar to connecting to a national or regional network.

Figure 4:
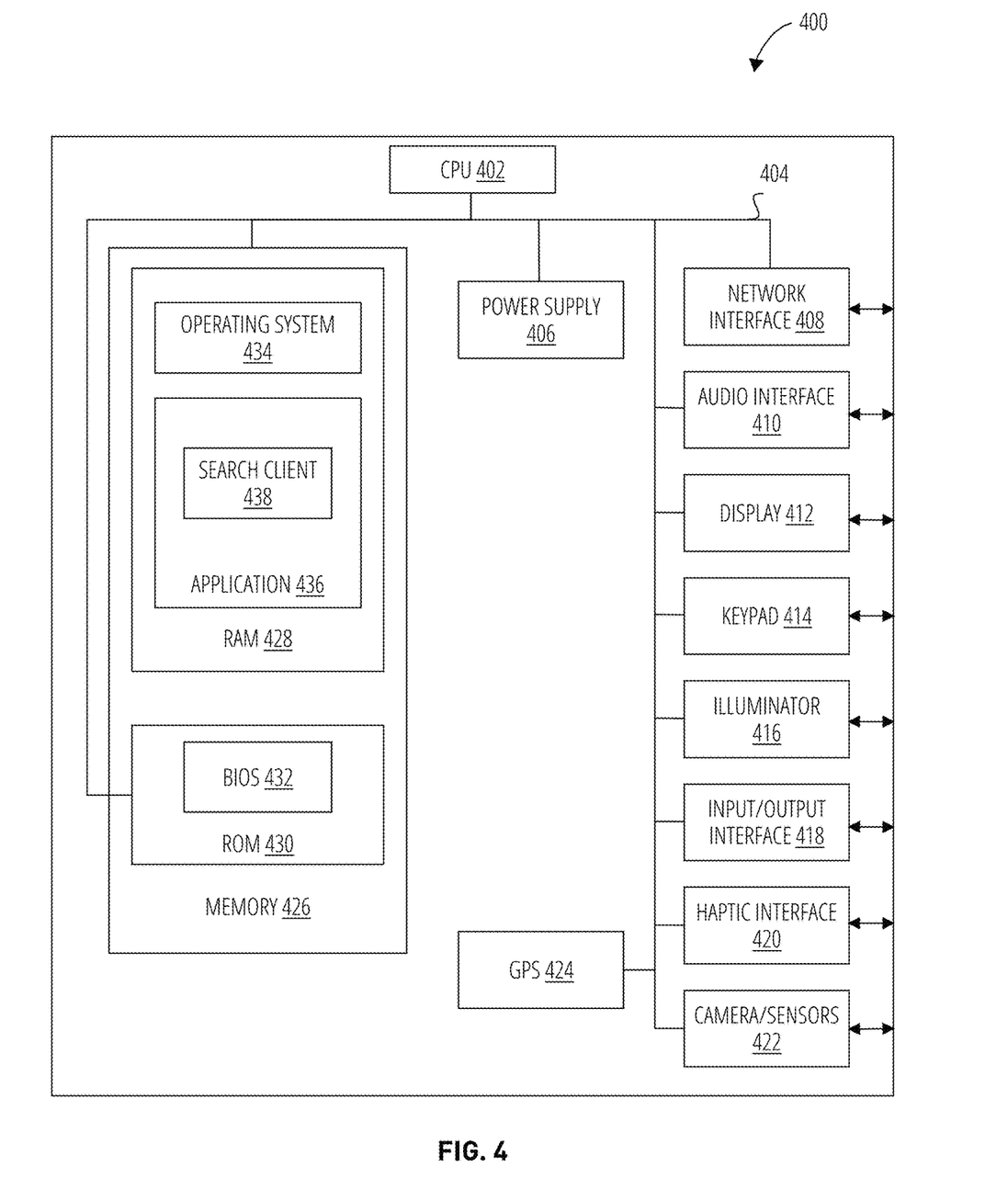
FIG. 4 is a block diagram illustrating a device showing an example of a client or server device used in various embodiments of the present disclosure.

FIG. 4 is a schematic diagram illustrating an example embodiment of a device 400 (e.g., a client device) that may be used within the present disclosure. Device 400 may include more or fewer components than those shown in FIG. 4. However, the components shown are sufficient to disclose an illustrative embodiment for implementing the present disclosure. Device 400 can be a representation of UE 302 as mentioned above.

As shown in the figure, device 400 includes a processing unit (CPU) 402 in communication with a mass memory 426 via a bus 404. Device 400 also includes a power supply 406, one or more network interface 408, an audio interface 410, a display 412, a keypad 414, an illuminator 416, an input/output interface 418, a haptic interface 420, an optional global positioning systems (GPS) receiver 424 and a camera(s) or other optical, thermal or electromagnetic sensor 422. Device 400 can include one camera/sensor 422, or a plurality of cameras/sensors 422, as understood by those of skill in the art. Power supply 406 provides power to device 400. Some devices may include additional components not shown, such as graphics processing unit (GPU) devices, cryptographic co-processors, artificial intelligence (AI) accelerators, SIM cards, or other peripheral devices.

In some embodiments, the CPU 402 may comprise a general-purpose CPU. The CPU 402 may comprise a single-core or multiple-core CPU. The CPU 402 may comprise a system-on-a-chip (SoC) or a similar embedded system. In some embodiments, a GPU may be used in place of, or in combination with, a CPU 402. Mass memory 426 may include a random-access memory (RAM) 428, a read-only memory (ROM) 430, and other storage means. In some embodiments, mass memory 426 may comprise a dynamic random-access memory (DRAM) device, a static random-access memory device (SRAM), or a Flash (e.g., NAND Flash) memory device. In some embodiments, mass memory 426 may comprise a combination of such memory types. In one embodiment, the bus 404 may comprise a Peripheral Component Interconnect Express (PCIe) bus. In some embodiments, the bus 404 may comprise multiple busses instead of a single bus.

Mass memory 426 illustrates another example of computer storage media for storage of information such as computer readable instructions, data structures, program modules or other data. Mass memory 426 stores a basic input/output system (BIOS) 432 for controlling low-level operation of device 400. The mass memory 426 also stores an operating system 434 for controlling the operation of device 400.

Mass memory 426 further includes one or more data stores, which can be utilized by device 400 to store, among other things, applications 436 and/or other information or data. For example, data stores may be employed to store information that describes various capabilities of device 400. At least a portion of the capability information may also be stored on a disk drive or other storage medium (not shown) within device 400.

Applications 436 may include computer-executable instructions which, when executed by the device 400, perform any of the methods (or portions of the methods) described previously in the description of the preceding Figures. In some embodiments, the software or programs implementing the method embodiments can be read from a hard disk drive (not illustrated) and temporarily stored in RAM 428 by CPU 402. CPU 402 may then read the software or data from RAM 428 or some other memory device, process them, and store them to RAM 428 again. Applications 436 may include computer-executable instructions which, when executed by device 400, transmit, receive, and/or otherwise process audio, video, images, text, and enable telecommunication with a server and/or another user of another device. Applications 436 may further include search client 438 that can be configured to send, to receive, and/or to otherwise process a search query and/or search result.

Device 400 may optionally communicate with a base station (not shown), or directly with another computing device. Network interface 408 is sometimes known as a transceiver, transceiving device, or network interface card (NIC).

Audio interface 410 may be arranged to produce and receive audio signals such as the sound of a human voice. Display 412 may be a liquid crystal display (LCD), gas plasma, light emitting diode (LED), or any other type of display used with a computing device. Display 412 may also include a touch sensitive screen arranged to receive input from an object such as a stylus or a digit from a human hand.

Keypad 414 may comprise any input device arranged to receive input from a user. Illuminator 416 may provide a status indication and/or provide light.

Device 400 also comprises input/output interface 418 for communicating with external devices. Input/output interface 418 can utilize one or more communication technologies, such as USB, infrared, Bluetooth™, or the like. Haptic interface 420 may be arranged to provide tactile feedback to a user of the device.

Optional GPS transceiver 424 can determine the physical coordinates of device 400 on the surface of the Earth, which typically outputs a location as latitude and longitude values. GPS transceiver 424 can also employ other geo-positioning mechanisms, including, but not limited to, triangulation, assisted GPS (AGPS), E-OTD, CI, SAI, ETA, BSS or the like, to further determine the physical location of device 400 on the surface of the Earth. In one embodiment, however, device 400 may, through other components, provide other information that may be employed to determine a physical location of the device, including for example, a MAC address, Internet Protocol (IP) address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

What is claimed is:

1. A method comprising:
   receiving, by a service communication proxy (SCP) on a network, a request from a Network Function (NF) consumer, the request including a set of parameters, the SCP operatively connected to a network repository function (NRF);
   identifying, by the SCP using the NRF, a plurality of target NF producers corresponding to the set of parameters;
   transmitting, by the SCP, the request to the plurality of target NF producers;
   receiving, by the SCP, a failure request response corresponding to one of the target NF producers having an associated second set of parameters; and
   retransmitting, by the SCP, the request to the target NF producer having the associated second set of parameters;
   receiving, by the SCP, a plurality of successful request responses corresponding to some or all of the plurality of target NF producers;
   transmitting, by the SCP, one of the plurality of successful request response to the NF consumer; and
   discarding, by the SCP, all other successful request responses.

2. The method of claim 1, wherein the NF consumer is a Cell Broadcast Center Function (CBCF) operatively connected to a Cell Broadcast Entity (CBE).

3. The method of claim 1, wherein the plurality of NF producers are a plurality of Access & Mobility Management Functions (AMF).

4. The method of claim 1, wherein some of the parameters of the set of parameters correspond to a geographic area.

5. The method of claim 1, wherein the SCP and the NRF form part of a segment of the network; and wherein the network comprises a plurality of segments each having one or more SCPs, one or more NRFs, and one or more NF producers.

6. The method of claim 1, further comprising:
   transmitting, by the SCP in response to the received failure request, the failure request response and the associated second set of parameters to the NF consumer; and
   receiving, by the SCP, a second request from the NF consumer, the request including the second set of parameters.

7. A non-transitory computer-readable storage medium, the computer-readable storage medium including instructions that when executed by a computer, cause the computer to:
- receive, by a service communication proxy (SCP) on a network, a request from a Network Function (NF) consumer, the request including a set of parameters, the SCP operatively connected to a network repository function (NRF);
- identify, by the SCP using the NRF, a plurality of target NF producers corresponding to the set of parameters;
- transmit, by the SCP, the request to the plurality of target NF producers;
- receive, by the SCP, a failure request response corresponding to one of the target NF producers having an associated second set of parameters; and
- retransmit, by the SCP, the request to the target NF producer having the associated second set of parameters;
- receive, by the SCP, a plurality of successful request responses corresponding to some or all of the plurality of target NF producers;
- transmit, by the SCP, one of the plurality of successful request response to the NF consumer; and
- discard, by the SCP, all other successful request responses.

8. The computer-readable storage medium of claim 7, wherein the NF consumer is a Cell Broadcast Center Function (CBCF) operatively connected to a Cell Broadcast Entity (CBE).

9. The computer-readable storage medium of claim 7, wherein the plurality of NF producers are a plurality of Access & Mobility Management Functions (AMF).

10. The computer-readable storage medium of claim 7, wherein some of the parameters of the set of parameters correspond to a geographic area.

11. The computer-readable storage medium of claim 7, wherein the SCP and the NRF form part of a segment of the network; and wherein the network comprises a plurality of segments each having one or more SCPs, one or more NRFs, and one or more NF producers.

12. The computer-readable storage medium of claim 7, wherein the instructions further configure the computer to:
- transmit, by the SCP in response to the received failure request, the failures request response and the associated second set of parameters to the NF consumer; and
- receive, by the SCP, a second request from the NF consumer, the request including the second set of parameters.

13. A device comprising:
a processor configured to:
- receive, by a service communication proxy (SCP) on a network, a request from a Network Function (NF) consumer, the request including a set of parameters, the SCP operatively connected to a network repository function (NRF);
- identify, by the SCP using the NRF, a plurality of target NF producers corresponding to the set of parameters;
- transmit, by the SCP, the request to the plurality of target NF producers;
- receive, by the SCP, a failure request response corresponding to one of the target NF producers having an associated second set of parameters; and
- retransmit, by the SCP, the request to the target NF producer having the associated second set of parameters;
- receive, by the SCP, a plurality of successful request responses corresponding to some or all of the plurality of target NF producers;
- transmit, by the SCP, one of the plurality of successful request response to the NF consumer; and
- discard, by the SCP, all other successful request responses.

14. The device of claim 13, wherein the NF consumer is a Cell Broadcast Center Function (CBCF) operatively connected to a Cell Broadcast Entity (CBE) and the plurality of NF producers are a plurality of Access & Mobility Management Functions (AMF).

15. The device of claim 13, wherein some of the parameters of the set of parameters correspond to a geographic area.

16. The device of claim 13, wherein the SCP and the NRF form part of a segment of the network; and wherein the network comprises a plurality of segments each having one or more SCPs, one or more NRFs, and one or more NF producers.

17. The device of claim 13, wherein the instructions further configure the device to:
- transmit, by the SCP in response to the received failure request, the failures request response and the associated second set of parameters to the NF consumer; and
- receive, by the SCP, a second request from the NF consumer, the request including the second set of parameters.

18. The method of claim 1, further comprising the failure response comprising information related to the target NF producer triggering the failure response.

19. The non-transitory computer-readable storage medium of claim 7, further comprising the failure response comprising information related to the target NF producer triggering the failure response.

20. The device of claim 13, wherein the processor is further configured such that the failure response comprises information related to the target NF producer triggering the failure response.

* * * * *